US008345585B2

(12) United States Patent
De Jaeger et al.

(10) Patent No.: US 8,345,585 B2
(45) Date of Patent: Jan. 1, 2013

(54) METHOD FOR OPTIMIZING THE ALLOCATION OF RESOURCES IN A CELLULAR NETWORK USING A SHARED RADIO TRANSMISSION LINK, NETWORK AND NETWORK ADAPTERS THEREOF

(75) Inventors: Bogéna De Jaeger, Paris (FR); Michel Mouly, Palaiseau (FR); Didier Verhulst, La Celle St Cloud (FR)

(73) Assignee: CELL & SAT, Paris (FR)

( * ) Notice: Subject to any disclaimer, the term of this patent is extended or adjusted under 35 U.S.C. 154(b) by 909 days.

(21) Appl. No.: 12/282,794

(22) PCT Filed: Mar. 12, 2007

(86) PCT No.: PCT/EP2007/052303
§ 371 (c)(1),
(2), (4) Date: Mar. 9, 2009

(87) PCT Pub. No.: WO2007/104741
PCT Pub. Date: Sep. 20, 2007

(65) Prior Publication Data
US 2009/0323604 A1  Dec. 31, 2009

(30) Foreign Application Priority Data
Mar. 14, 2006  (FR) ...................................... 06 02222

(51) Int. Cl.
*H04B 7/00* (2006.01)
(52) U.S. Cl. .......................... 370/310; 370/401; 370/522
(58) Field of Classification Search .......................... None
See application file for complete search history.

(56) References Cited

U.S. PATENT DOCUMENTS

| 5,761,195 A | 6/1998 | Lu et al. ......................... 370/329 |
| 2002/0151303 A1 | 10/2002 | D'Allest ........................ 455/427 |
| 2004/0024791 A1 | 2/2004 | Martin et al. .................. 707/200 |

(Continued)

FOREIGN PATENT DOCUMENTS

EP  0 797 319  9/1997

(Continued)

OTHER PUBLICATIONS

French Search Report from counterpart foreign Application No. 06/02222.

(Continued)

*Primary Examiner* — Kevin C Harper
(74) *Attorney, Agent, or Firm* — David D. Brush; Westman, Champlin & Kelly, P.A.

(57) ABSTRACT

A method is provided for optimizing allocation of transmission resources in a mobile radio communication cellular network. The network has at least one base station controlled by a base station controller, and a connecting network connecting the base stations(s) with the base station controller, wherein setting up, maintaining and terminating a communications channel between a mobile station located in the cellular network are implemented by exchanges of signalling messages. The connecting network includes at least one radio link with shared resources between the base station(s) and the base station controller. Such a method includes: analysing content of all or a portion of the signalling messages, including searching for and detecting in the content of the signalling messages data indicating a traffic activity; and allocating or not allocating a resource channel in the radio link with shared resources according to data indicating a traffic activity.

25 Claims, 4 Drawing Sheets

U.S. PATENT DOCUMENTS

2005/0187777 A1* 8/2005 Chevallier et al. ............ 704/500
2007/0142044 A1* 6/2007 Fitzgerald et al. ......... 455/422.1
2007/0202802 A1* 8/2007 Kallio et al. ................. 455/11.1

FOREIGN PATENT DOCUMENTS

| | | |
|---|---|---|
| EP | 1 282 320 | 2/2003 |
| EP | 1 387 592 | 2/2004 |
| FR | 2 803 713 | 7/2001 |

OTHER PUBLICATIONS

International Search Report from counterpart foreign Application No. PCT/EP2007/052303.

* cited by examiner

METHOD FOR OPTIMIZING THE ALLOCATION OF RESOURCES IN A CELLULAR NETWORK USING A SHARED RADIO TRANSMISSION LINK, NETWORK AND NETWORK ADAPTERS THEREOF

CROSS-REFERENCE TO RELATED APPLICATIONS

This Application is a Section 371 National Stage Application of International Application No. PCT/EP2007/052303, filed Mar. 12, 2007 and published as WO 2007/104741 on Sep. 20, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of communication networks. More precisely, the disclosure relates to cellular networks such as in particular, but not exclusively, GSM ("Global System for Mobile") or UMTS ("Universal Mobile Telecommunications Service"), wherein are implemented infrastructure links with radio transmission, for example of the satellite type.

The disclosure applies particularly, but not exclusively, to a radio system making it possible to link, via a satellite, a set of base stations, called BTS in the case of GSM (Node B in the case of UMTS), with a central equipment called Hub, which has the role of allocating the radio resources via satellite needed for the transmission between the base stations and their base station controller, called BSC in GSM (RNC in the case of UMTS).

More generally, this disclosure has an application in any cellular network including a radio link with shared resources able to be managed dynamically.

Here, dynamic allocation means the allocation of resources according to the needs of the traffic of the radio channels, in the time slots as well as in the frequency domain.

Finally, the disclosure also applies to radio systems with static allocation of resources, but wherein it is possible to emulate dynamic operation.

The disclosure is particularly adapted to the implementation of a cellular network in rural or isolated zones where the communication traffic is relatively low.

BACKGROUND OF THE DISCLOSURE

First of all, with a concern for clarity, the disadvantages of prior art are presented here in the particular case of the GSM standard. However, an embodiment of this invention also applies as has been shown to any type of cellular network. Those skilled in the art can easily implement an embodiment of this invention in a network of the UMTS type or other type.

The increasing popularity of the GSM system across the entire world has led the operators to deploy this service not only in the urban regions, but also more and more in rural areas. In this latter type of region, the land infrastructure is often insufficient or poorly adapted to provide the deployment of the network. A radio link system via satellite is then a very good means to extend the GSM service and this type of solution is commonly used today to provide the transmission to remote equipment, such as base stations.

However, satellite resources are costly, and all of the problems with this type of application reside in the techniques for reducing the bandwidth needed for the transmission of data via satellite.

For more clarity, the disadvantages of the prior art are described hereinafter in the specific case of a cellular network infrastructure implemented by the intermediary of a static satellite link or a dynamic satellite link of the DAMA type (for "Demand Assigned Multiple Access"). However, an embodiment of the invention applies more generally to any cellular network implementing a link of the radio with shared resources type.

1. Architecture of GSM

Figure 1:
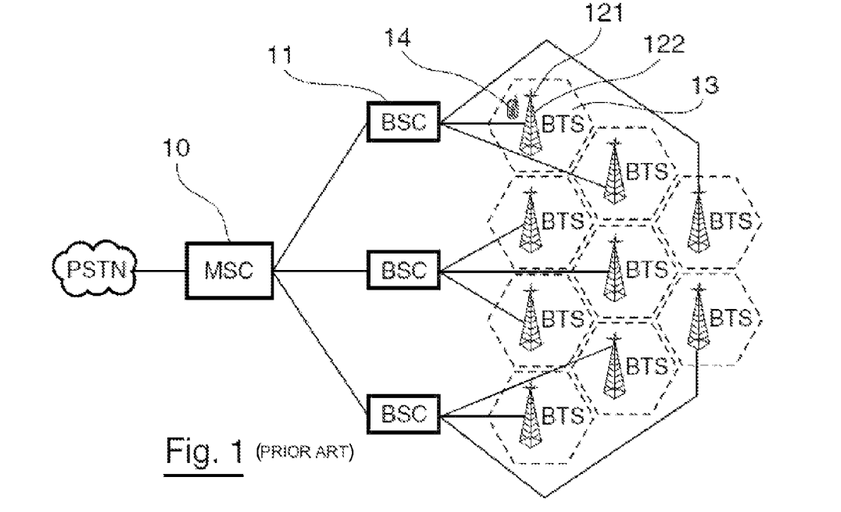
FIG. 1, already presented in relation with prior art, shows the architecture of the GSM network.

In relation with FIG. 1, the conventional architecture of a cellular network of the GSM type comprises a mobile service switch 10, called MSC (for "Mobile Switching Centre"), a base station controller 11, called BSC (for "Base Station Controller") and finally one or several base stations 12, called BTS (for "Base Transceiver Station").

Each BTS provides the GSM radio coverage in one or several cells. By way of example, in relation with FIG. 1, the BTS 121 is controlled by the BSC 11 and covers the geographic cell 13, wherein is located a certain number of users having a Mobile station (MS) for radio communication 14.

More precisely, the MSC controls the configuration of calls for each incoming or outgoing call, and it has the role of an interface with the other telecommunication networks. Each communication goes through the MSC, which controls several BSC.

The BSC is in charge of allocating the radio channels needed for each call. It handles the intercellular transfers between two BTS. A single BSC supports several BTS which provides coverage for a large geographic zone.

Finally, a BTS has for role to carry out the GSM radio transmission with the users of Mobile Stations. The BTS are located in the vicinity of "masts" 122 supporting antennas, and distributed in the geographic space of coverage of the cellular network.

The GSM standard and its evolutions, such as defined by the 3GPP group (for "Third Generation Partnership Project"), make use of voice compression. This compression is carried out by a transcoder also called TC. According to the GSM standard, the TC can be implemented at the MSC site, at the BSC site or at the BTS site. Economic considerations lead to implementing more preferably the TC at the MSC site, so as to reduce transmission costs.

Several types of codecs have been defined by the 3GPP group. The codec GSM FR "full rate" codec operates at a rate of 13 kbit/s. The HR "half rate" and EFR "enhanced full rate" codecs operate at 5.6 kbit/s and 12.2 kbit/s respectively. After transcoding, speech at 64 Kbit/s compressed to 13/12.2 kbit/s (respectively 5.6 kbit/s) is carried to the base station BTS over a time slot at 16 kbit/s (respectively 8 kbit/s). According to the 3GPP TS 08.60 (respectively TS 08.61) specification, the compressed speech is transmitted to the BTS every 20 ms according to the frame format TRAU (for "Transcoder and Adaptation Unit").

These same principles apply to the AMR ("Adaptive Multi Rate") full rate FR and reduced rate HR codings.

The TRAU frame carries, in addition to compressed speech data, signalling data of the "control bits" type making it possible to optimise the quality of the communications between the transcoding entity TC and the channel coding/ decoding unit CCU (for "Channel Codec Unit") with the BTS. These control bits make it possible in particular to provide the synchronisation of the data exchanged, to define the type of codings used (FR, EFR, HR or AMR), and also to indicate the discontinuity of the transmission linked to the silence in the speech (DTX).

Figure 2:
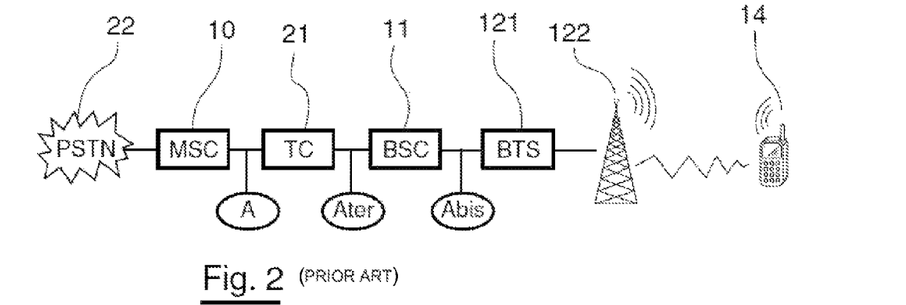
FIG. 2, already introduced in the prior art section, shows as a diagram the interfaces implemented in a GSM cellular network.

In such a way as to introduce the implementation of a satellite link within a cellular network, in relation with FIG. 2, the interfaces implemented are now described succinctly and their denomination between the main entities introduced previously.

The PSTN (for "Public Switched Telephone Network") is denoted as PSTN 22.

The interface between the MSC 10 and a BSC 11 is referred to as interface A.

The interface between a BSC 11 and the BTS 121 is referred to as the interface Abis.

In the case where the TC 21 is implemented at the MSC site 10, the interface between the TC 21 and the BSC 11 is called Ater.

A satellite link can be used within the transmission chain for each of these interfaces. The main problem with inserting a satellite link on one of these interfaces is then to determine how to effectively transmit the necessary data while minimising the radio band needed for the transmission via satellite.

The interface A, used between a MSC and a BSC, is constituted of one or several 2 Mbit/s links (ITU G703/G704 standard). Each 2 Mbit/s link supports 30 uncompressed voice channels—at 64 kbit/s—and one signalling channel SS7. The number of 2 Mbit/s links depends on the sizing of the BSS subsystem. The signalling channel contains messages indicating in particular the traffic needs according to the number of communications.

The interface Abis connects a BSC with a BTS and is constituted of one or several 2 Mbit/s links (ITU G703/G704 standard). It is one of the interfaces which is conventionally implemented with a transmission via satellite.

This interface Abis carries traffic data, such as compressed voice and signalling data.

On the interface Abis, two types of signalling data circulate:

signalling messages exchanged with the BTS, transported in a specific signalling channel, which make it possible to control the BTS equipment itself as well as the mobile station (MS) which are in relation with it. The corresponding messages are specified by the GSM in the TS 08.58 specification.

control "in band" data which is transmitted in the same flow as the traffic data. This data is transmitted within TRAU frames. This data is "control bits", complementary to the "data bits", of which the meaning is explained in the TS 08.60/08.61 specifications.

The signalling data of the first type, constituted of protocol messages, is carried over dedicated time slots, with typically over the interface Abis a rate of 64 kbit/s.

Each 2 Mbit/s link of the interface Abis has 31 time slots (TS) which are allocated to the signalling channels or to the speech channels. According to the typology of the network and coding choices for the speech, a 2 Mbit/s link on the interface Abis can typically be used to support up to ten radio transmission access channels, called TRX ("Transceiver"). Each TRX in turn supports eight GSM channels dedicated to speech at full rate FR or sixteen GSM channels at half rate HR. The corresponding reservation of the speech channels on the interface Abis represents for each TRX an allocation of 2 TS at 64 Kbit/s (8*16 Kbit/s=16*8 Kbit/s=128 Kbit/s).

According to the sizing of the GSM network, the BTS is equipped with a number N of TRXs, which induces a proportional occupation of the number of time slots TS on the interface Abis.

2. Satellite Applications

Figure 3:
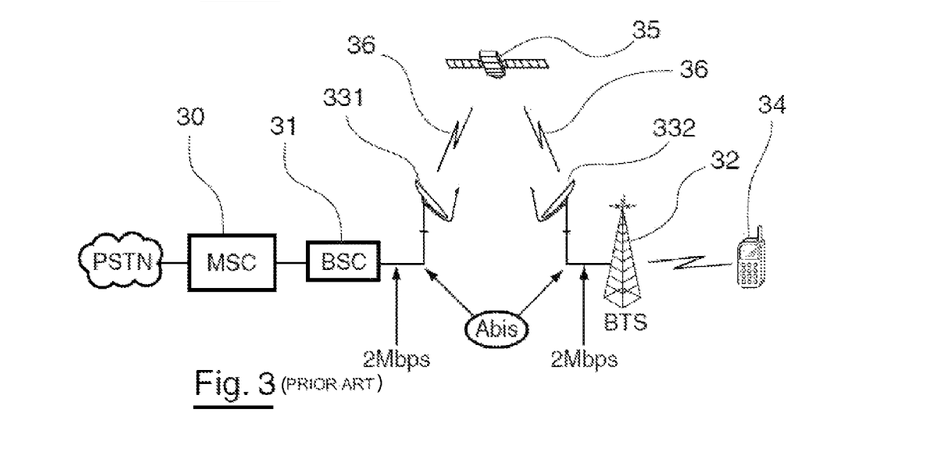
FIG. 3 relates to the implementation of a radio link via satellite in a GSM network, according to prior art.

A conventional GSM network implementing a radio link of the satellite type is described in relation with FIG. 3.

The GSM connecting network then comprises, conventionally, a MSC 30, a BSC 31 as well as a base station BTS 32, providing the communications to users having a mobile terminal 34 and located in the coverage area of the BTS 32.

In addition, a radio link 36 is implemented on the interface Abis, between the BSC 31 and the BTS 32. This radio link 36 is provided by a radio system via satellite containing two antennas 331 and 332 for emitting-receiving on each side of the interface Abis, and a satellite 35.

Note that it is possible in fact to insert a radio link via satellite on each of the interfaces implemented in the GSM system: A, Abis, Ater. But the insertion of such a satellite link on the interface Abis, i.e. between a BSC and BTSs, is very often preferred in order to extend the GSM service to remote geographic locations and of a low density of users with minimal infrastructural costs.

So as to avoid any confusion, it is important to note that in such an implementation, two types of radio systems are implemented, but that they do not have the same role:

The GSM network itself uses a first radio link to communicate, and in particular to carry out the transmission between the BTSs and the users of mobile station.

The satellite system consists of a second radio transmission link. Conventionally, a device called Hub allocates the radio resources needed for the transmission of data by satellite between BSC and BTS.

In what follows of the description, radio resources are referred to: this denomination thus concerns the radio transmission link via satellite, but it can be extended according to an embodiment of the invention to any other type of radio link with shared resources, as for example links via radio beams ("microwaves"), or systems of the LMDS type ("Local Multipoint Distribution Systems"), or other land transmission systems of the WiFi, WiMAX (for "Wireless Microwave Access") type, etc.

Very generally, in the case of interest here, the transmission of data between the BTS and the BSC is thus provided by a radio link with shared resources.

Conventionally, in relation with FIG. 3, in the systems of prior art, the satellite link will use a fixed-rate resource for each type of communication (typically 16 kbit/s or 8 kbit/s in GSM), used to carry voice as well as data.

The most common method, with static resources, consists in permanently reserving satellite resources to transport the maximum number of communications likely to be present at the interface Abis. A more effective method with dynamic resources is also sometimes used today, and consists in assigning and releasing the satellite resources as the effective traffic changes between the BSCs and the BTSs. The dynamic allocation of the satellite radio resources, corresponding in fact to frequency and power resources on a satellite transponder, is in general controlled by a central hub, according to a method of the DAMA type.

The DVB-RCS system (for "Digital Video Broadcasting-Return Channel by Satellite") is an example of a standard utilised to transmit data via satellite. In this type of system, the data is sent in packet mode, in both directions of transmission.

In the "downstream" direction, from the hub to the terminal stations, broadcast channels in the DVB-S ("Digital Video Broadcasting by Satellite") standard are used and all of the BSC-BTS links are multiplexed in it in a timely manner. In the "upstream" direction, from the terminal stations to the hub, dynamic management of time and frequency resources is performed by the hub, according to the DVB-RSC protocol, in order to:

avoid collisions between the various sources that are sharing the same transponder guarantee a rate and a transmission delay that is compliant with the quality of communications required.

An embodiment of this invention applies in particular to configurations using a satellite channel managed in DVB-S/DVB-RCS mode.

3. Techniques for Optimising Radio Resources

A major objective in the implementation of such radio links via satellite in order to realise cellular infrastructure links is to reduce as much as possible the band needed for the various transmissions, so as to reduce costs. To date there are several known techniques.

So as to optimise the allocation of radio resources, techniques have been developed according to which the signalling data contained in the TRAU frames is analysed, thus aiming to avoid the transmission of data during the silences in speech. Likewise, the high rate of inactivity on the signalling channels can be taken into account in order to further reduce the volume of data exchanged. These technologies, sometimes described under the name of "compression" methods, analyse with regards to speech the control bits encapsulated in the frames intended for the TRAU and the BTSs. Such an analysis makes it possible to reduce the rate of the radio channels assigned since it makes use of the fact that speech communications have an effective rate of activity generally in the neighbourhood of 50% (since it is rare to speak and to listen at the same time).

Finally, with regards to the management of radio resources via satellite link, a common technique consists in using a DAMA (for "Demand Assigned Multiple Access") system. Note moreover that certain satellite systems are of "star" configuration and connect all of the terminal stations with a central hub, while other satellite systems are "meshed" and allow any user to be directly placed into communication, in a single satellite hop, with any other regardless of his position in the network and without necessarily passing through the central hub. The DAMA satellite systems, in star or meshed configuration, optimise the satellite link by dynamically allocating the satellite resources to each active node of the network, according to demand.

For example, a DAMA network can allocate in certain implementations a fixed communication channel to each call, chosen from a reservoir or "pool" of channels. The allocation of resources is then of the on-demand "circuit" type for each terminal. This makes it possible to optimise the downstream and upstream capacity and therefore to increase the number of users on a determined transponder.

Another technique for optimising the allocation of radio resources consists in using a "packet" mode to transmit the data on the shared radio channel and to implement a buffer.

The buffer also makes it possible to store a certain number of speech frames of the TRAU type, or packets containing signalling messages, and to send these frames as "bursts" over a higher rate link. The size of the buffer is therefore typically a number of packets, each one corresponding to a speech frame of 20 ms. Since certain speech frames correspond in fact to silence, and since there is also a high rate of inactivity on the signalling channels, the buffering technique makes it possible to benefit from the activity factor by sending only the significant data packets, which reduces the quantity of radio resources used accordingly. This technique has maximum effectiveness in the downstream connection where a large number of links share a single broadcast channel, but it is more difficult to implement in the upstream direction where each link utilises specific resources to transmit the data to the central hub.

4. Disadvantages of Prior Art

The major disadvantage of the techniques of prior art resides in the fact that they remain costly, due to the implementation of a radio link of the satellite type that is generally over-sized, despite the efforts that have already been made to optimise the allocation of radio resources with the compression of the exchanges of TRAU frames of speech and signalling flows according to the techniques presented previously.

Broadband satellite systems, such as DVB-RCS, have in fact the disadvantage of having been designed substantially for the transfer of Internet data, are therefore poorly optimised for specific applications with real time constraints such as voice.

Indeed, the type of data to be transmitted from or to the Internet can vary significantly, especially in terms of the size of files, but also with regards to the content and the duration of communications. Due to this diversity in the types of data to be transmitted, the current satellite systems have difficulty in guaranteeing a quality of service that is compatible with the real time constraint, and in particular a transfer time that is sufficiently low and constant, except with an increase of the resource allocated in relation to the needs that are strictly necessary:

either statically by permanently allocating speech circuits without taking into account the effective traffic of the cells or dynamically by allocating for each call an oversized satellite radio channel, without taking into account the detailed knowledge of the exact status of each communication and the actual data transfer needs at each step of the calls.

It is observed moreover that the current systems via satellite, due to the rather long transfer time of a magnitude of 250 milliseconds for a geostationary-earth-orbiting satellite, do not know how to react quickly to the appearance and the releasing of communications, which has a non-negligible impact on the quality of the communications as perceived by the users, unless once again an over-allocation of radio resources is used.

SUMMARY

A method is provided for optimising the allocation of transmission resources in a mobile radio communication cellular network, the cellular network comprising at least one base station, called BTS, controlled by a base station controller, called BSC, and a connecting network connecting the BTS(s) with the BSC, method of the type consisting in setting up, maintaining and terminating of communications with mobile station located in the cellular network, the setting up, maintaining and terminating of communications implementing exchanges of signalling messages, the connecting network including at least one link of the radio with shared resources type between the base station(s) and the base station controller.

According to an embodiment of the invention, such a method includes the following phases:

a first analysing phase of the content of all or a portion of the signalling messages, the analysing phase including a step of searching for and detecting in the content of the signalling messages data indicating a traffic activity;

a second phase of allocating or not allocating a resource channel within said radio link with shared resources according to data indicating a traffic activity.

An embodiment of the invention is therefore based on an approach which is entirely new and inventive of dynamic allocation of radio resources particularly adapted for the transfer of data with a high real-time constraint of the voice type. For this, an embodiment of the invention proposes to allocate the resources needed only after receiving a triggering element, and according to a pertinent analysis of the status of the cellular network.

In the method of an embodiment of the invention, the allocation of resources managed by the method can also concern rate resources, as well as resources concerning frequency, power, resources of the circuit type, or resources adapted to the packet mode (address, size, queue, priorities, etc.).

The method of an embodiment of the invention applies to communications between two users of the cellular network, as well as to communications between a user of the cellular network and a user of the conventional fixed telephone network, outside the cellular network.

A communication with a subscriber of the cellular network is made by using a traffic channel and signalling data. The latter is sent in parallel in the traffic channel or in the form of messages in specific signalling channels.

More precisely, an embodiment of the invention therefore analyses and spies the contents of the signalling messages wherein it detects data making it possible to know the exact activity of the cellular network as well as the needs in radio resources.

These signalling messages are initially intended and specific to the equipment relative to the cellular network. The method therefore "intercepts" these messages and reads their content in order to deduce an optimal allocation of radio transmission resources. In addition, this analysis and detection is carried out in a manner that is entirely transparent with regards to the base station controllers and the base stations themselves, the cellular network being totally unaware that these signalling messages are interpreted. As such, the method of an embodiment of the invention is easily implemented in any type of cellular network, with no intervention on the latter.

In other terms, contrary to the conventional techniques of prior art, according to which the allocation of resources is accomplished either in a manner which is permanent regardless of the traffic, or with an over-allocation of resources as soon as a need for data transport is detected, an embodiment of the invention proposes first of all to finely analyse the status of the communications in progress, in order to consequently allocate, and in an optimised manner, the resources that are needed for this communication. As such, the risk is avoided that the radio resources are allocated too early than they need to be, and of wasting these resources, or too late with an unacceptable impact on quality of service.

There is thus a gain in terms of cost and set-up time, while maintaining an equivalent quality of service, and even better than that obtained with the conventional implementations.

Advantageously, the analysing phase comprises an additional step to detect if the mobile station of the communication are located downstream of the same termination of the radio link with shared resources, according to a detection strategy including a step of analysing all or a portion of the signalling messages, as well as possibly data exchanged between the mobile station, and comprises a third phase of triggering a local loopback operation of all or a portion of the data exchanged between the mobile station, without reservation of a traffic channel within the radio resources, in the case where the detecting phase confirms that the caller and the called party of the communication are located downstream of the same termination of the radio link with shared resources, the third phase then having priority in relation to the second phase.

In a preferred embodiment, an embodiment of the invention carried out a direct loopback of the flow of data exchanged between a caller and a called party when the latter are located in the same local zone.

More precisely, an embodiment of the invention implements a detection strategy according to which it searches in the succession of signalling messages for data representing that two users are located in the same local zone. According to the results of this analysis, the method of an embodiment of the invention loops back the data to be transmitted during a communication, if the latter is of a local nature.

The fact that certain data is looped back makes it possible to avoid having it revert all the way to the base station controller, and thus have it transit needlessly by the radio link, which is costly. The transfer time for the data is then also substantially reduced in the case of links via geostationary-earth-orbiting satellites, which has a major impact on the quality perceived by the users in the case of telephone communications.

Advantageously, the signalling messages continue to be carried normally even in the case of local loopback.

The "conventional" operation of the cellular network is therefore not disturbed.

Advantageously, the data indicating a traffic activity is constituted by a signalling message indicating the characteristics of needs to allocate resources in the link between the base station and a caller mobile station, or the base station and the called party mobile station.

The method according to an embodiment of the invention "collects" the data concerning the status of network traffic by reading the contents of specific signalling messages transiting between the caller and its corresponding base station, as well as the signalling messages transiting between the called party and its corresponding base station.

Advantageously, the second phase comprises an additional step of searching for and detecting, in the signalling messages, data indicating a termination of a need of traffic, the method comprises a fourth phase of releasing resources that were previously allocated within the radio link with shared resources according to the data indicating a termination of a need of traffic.

The method of an embodiment of the invention, through its pertinent analysis of the needs of resources for the data traffic, is also in a position to allocate communication channels, as well as release them, according to the changes in the traffic and the load on the network.

Advantageously, the allocation of resources within the radio link with shared resources consists in reserving an elementary communication resource at a predetermined rate within the shared radio resources, from among a plurality of elementary resources that can be reserved individually.

An elementary communication resource has for example a channel with a rate of 16 kbit/s for full rate (FR) or 8 kbit/s at half rate (HR) voice communication.

Advantageously, the radio link with shared resources is constituted of a plurality of transmission channels that can be reserved incrementally, and a prediction of needed radio resources takes into account the radio resources that have already been allocated in the radio link with shared resources, in order to optimise the global usage of the radio resources.

This prediction of resource needs takes into account for example the traffic "mode" of the communication in the process of detection, and/or previous allocations, for example according to optimisation laws such as the Erlang law. This prediction can also take into account the data transiting by the "in-band" channel of the communications concerned.

In the case of the transmission of data on shared channels in packet mode, an incremental quantity of resources can also be allocated, for example by enlarging the size of the channels used taking into account the total rate already offered and the characteristics of quality of service required by all of the communications.

According to the results of its analysis of the status of the traffic on the cellular network, the method predicts a quantity of radio resources to allocate in order to maintain all of the necessary communications. Subsequently, the method adapts, via allocating or releasing radio resources, according to the change in traffic needs.

The first phase can also take into account the "in band" control signalling that transits in the traffic channels, as with the methods of compression explained previously that make use of the content of the TRAU frames. As such the allocation of resources of the second phase can take into account the fine characteristics of the exchanges, for example by optimising the quantity of resources assigned by taking into account the type of codings, the speech activity rate, etc.

In a particular embodiment, the traffic channel of the communication carries data with a real-time constraint, such as a flow of speech.

The method of an embodiment of the invention is particularly well adapted to the particular context of voice communication.

The method of an embodiment of the invention comprises a prediction step that plans to reserve a rate of 16 kbits/second in Full Rate mode and/or 8 kbits/second in Half Rate mode.

Advantageously, the signalling messages are compliant with the GSM standard, and the data indicating a traffic need is the reception of the "ACTIVATE" message.

Advantageously, the signalling messages are compliant with the GSM standard, and the data indicating the end of a traffic need is the reception of the "RF CHANNEL RELEASE" message.

The method of an embodiment of the invention as such makes use of the existence of predefined messages, such as those that are found in the GSM standard.

It is clear that an embodiment of the invention applies to any type of cellular network wherein the existence of this type of signalling messages is found: UMTS, and more generally all of the evolutions in the GSM standard.

Advantageously, the radio link with shared resources is of the satellite link type, with centralised management of the shared resources of the DAMA ("Demand Assigned Multiple Access) type.

In addition, the method of an embodiment of the invention can also be implemented in order to optimise the allocation of the channels of a link with shared resources located between the BSC and the MSC of a cellular network of the GSM or equivalent type.

The optimisation can thus be carried out with shared radio resources providing the transmission on the interface Ater, which has speech coding characteristics that are similar to those of the interface Abis, or on the interface A that carries uncompressed speech signals at 64 kbit/s. In the case of these interfaces, the analysis of the status of the traffic is accomplished using messages exchanged over the MSC-BSC interface.

Advantageously, the first phase includes an additional step of analysing the "in band" control data that transits in the traffic channel and it makes it possible to take into account in the allocation of the radio resources of other data concerning the type of codings used, the speech activity rate, etc.

An embodiment of the invention also relates to a cellular network implementing the method described previously.

Advantageously, in such a cellular network, the functions of implementing phases and steps are located in at most three adapter devices located in the network, and the adapters belong to the group comprising:

a first adapter located on the base station(s);
a second adapter located on the central equipment for managing shared radio resources;
a third adapter located on the base station(s) controller.

In other terms, the method of an embodiment of the invention is implemented by a set of devices, called adapters. These adapters thus contain the means of implementing the method for optimising such as described, i.e. that they are in a position to analyse the signalling messages, and to request the allocation or the releasing of radio transmission resources.

In a particular embodiment, the cellular network comprises three types of adapters, located respectively in the vicinity of the base stations, in the vicinity of the central radio communication equipment (Hub satellite for example) and finally in the vicinity of the base station controller(s). Each of these adapters is thus able, according to need and the operating mode chosen, of reading and analysing the messages specific to the type of link or interface on which they are arranged.

Of course, these locations are not limiting, and an embodiment of the invention applies to any network comprising at least one of these adapters, of which the location shall be linked to the specific need of optimising resources, according to the embodiment chosen.

Advantageously, such a network also comprises means of operating and maintaining adapters. These means communicate with each of the adapters in such a way as to configure and supervise the adapters.

As such, for example, the central operation and maintenance equipment can configure the adapters remotely in order to activate or not to activate certain particular operating modes. As such, certain detection modes can be activated or not activated, on such and such a signalling type, and parameters can be set for the resource allocation algorithms of the adapters.

The operation and maintenance equipment is also able to detect alarms indicating any operating defects concerning the adapters.

The operation and maintenance equipment is also in charge of collecting observations pertaining to traffic and the quality of service (duration, call success rate, etc.), which will make it possible to verify the proper operation of the device and to measure in particular that the optimisation of the radio transmission resources is accomplished while guaranteeing a good quality of the service. It is also possible that the observations carried out throughout the device be used to determine certain billing items, for example by taking into account the possible local nature of the communications.

Such a cellular network is of the type comprising at least one base station BTS controlled by a base station controller, called BSC, and a connecting network between the BTS(s) and said BSC, the connecting network including at least one link of the radio with shared resources type upstream of the BTS(s). According to an embodiment of the invention, such a cellular network comprises a first means of adaptation A1 connected on one side to the BTS(s) by an interface of the E1 type, and on the other side to a termination equipment of said radio link.

The functions of the adapter A1, according to an embodiment of the invention, are in particular but not exclusively as follows:
- analyse signalling messages exchanged with said BTS(s) and/or in-band control data in the traffic channels;
- analyse the need for local loopback and/or triggering of a local loopback operation;
- communication with a central equipment for maintenance operation.

The adapter A1 is thus in a position to analyse the need for setting up or releasing radio transmission resources which can optionally be controlled locally at the terminal radio, or which can be relayed to (or carried out directly by) another adapter near the central equipment for controlling radio resources. Such an adapter can also analyse a need for loopback, its exact characteristics (which channel, which TS, which TRX of the BTS, etc.) and the implementation of the latter, as well as the loopback removing operations when necessary. It communicates with the central equipment for operation and maintenance.

Advantageously, the connecting network including at least one second link of the Internet Protocol (IP) type, the network of an embodiment of the invention comprises:
- a second means of adaptation A2 located between the radio transmission link and the link of the IP type;
- a third means of adaptation A3 located between the network of the IP type and the base station controller.

The traffic and signalling data is then transported by packets according to the standard Internet IP protocol between the second and third means of adaptation.

In an embodiment, the invention applies to a cellular network wherein a link between a base station controller and a base station is supported not only by a link of the radio with shared resources type, but also by implementing the Internet protocols of the IP type.

In an embodiment, the data exchanged between the first and second means of adaptation A1 and A2, utilising the radio network with shared resources, does not carry the "overheads" needed for the IP protocol, which are introduced only between A2 and A3.

Here also there is a gain in necessary radio resources.

In another embodiment the adapter A1 utilises the "overheads" necessary for the IP protocol and consequently:
- A1 can communicate directly with A3 according to the IP protocol;
- A2 may not be introduced in the connecting network.

In other terms, all of the fields needed for the IP protocol are added at the interface A1, which makes it possible to use the radio link (via satellite) strictly in an IP mode and to easily continue in IP mode until adapter A3. This method is suboptimal in terms of radio resource usage, but it has the advantage of being able to possibly avoid introducing the second adapter A2.

In a preferred embodiment, the radio link with shared resources implements a satellite, for example a geostationary-earth-orbiting satellite.

Note that the same principles can apply also with different satellite solutions of the LEO "Low Earth Orbit", MEO "Medium Earth Orbit" type, etc.

Finally an embodiment of the invention relates to the adapters such as described previously.

Such an adapter according to an embodiment of the invention constitutes in particular an adapter A2 and fulfils in particular at least one of the functions belonging to the following group of functions:
- conversion of signals transiting through the radio/IP interface, in one direction or the other in particular:
  - adding/removing from the transmitted signals all of the protocol elements needed for IP transport;
  - optimisation of the radio link in "packet" mode as simply as possible, without the elements linked to the IP protocol;
- implementation of the phases of analysing signalling messages and/or allocating or not allocating resources within the radio link with shared resources;
- analysing a need and/or triggering of a local loopback operation and/or permanent verification of a need for "non loopback" via a specific internal message;
- transfer of the speech data received from the BTS/radio interface A1 to the radio/IP interface A2 in order to reconstitute coherent speech data at the BSC in order to satisfy legal interception requirements.

An adapter according to an embodiment of the invention can furthermore constitute an adapter A3, and fulfil in particular at least one of the functions belonging to the following group of functions:
- conversion of the signals transiting through the IP/BSC interface A3, in one direction or the other in particular:
  - adding/removing from the transmitted signals all of the protocol elements needed for IP transport;
  - reconstitution of a standard interface Abis with the BSC;
- generation of a virtual speech flow, for example a random flow, to supply the BSC in case of local loopback;
- reconstitution of coherent speech data at the BSC, based on speech data of the BTS/radio interface A1, in order to satisfy legal interception requirements;
- reconstitution, where applicable, of coherent speech data.

In one of its embodiments, such an adapter is incorporated into a control device for the shared resource link.

The functions of adapters A2 and A3 can furthermore be confounded in the same piece of equipment.

In an embodiment, an adapter according to the invention comprises the first means of adaptation A1 in such a way that the latter are incorporated into the base station.

In other terms, in one of its embodiments, the base stations of the cellular network according to the invention include themselves means of analysing signalling messages and optimising the allocation of radio resources, and as such implement the method for optimising according to the invention.

Finally, in a particular embodiment, an adapter according to the invention comprises the third means of adaptation A3 in such a way that the latter are incorporated into the base station controller.

BRIEF DESCRIPTION OF THE DRAWINGS

Other characteristics and advantages shall appear when reading the following description of a preferred embodiment of the invention, given by way of an indicative and non limiting example (all of the embodiments of the invention are not limited to the characteristics and advantages of this preferred embodiment), and the annexed drawings, wherein.

DETAILED DESCRIPTION OF ILLUSTRATIVE EMBODIMENTS

1. General Principle

An embodiment of the invention as such is based on an approach which is entirely new and inventive of optimising the allocation of radio resources. The general principle is based for this on the analysis of the signalling channel of GSM signals (and its extensions and improvements) according to which are determined the radio channels to be allocated.

Note however that this differs clearly from the techniques of prior art wherein radio resources are assigned systematically as soon as a need for data transfer is detected by the radio transmission system via satellite.

Figure 4:
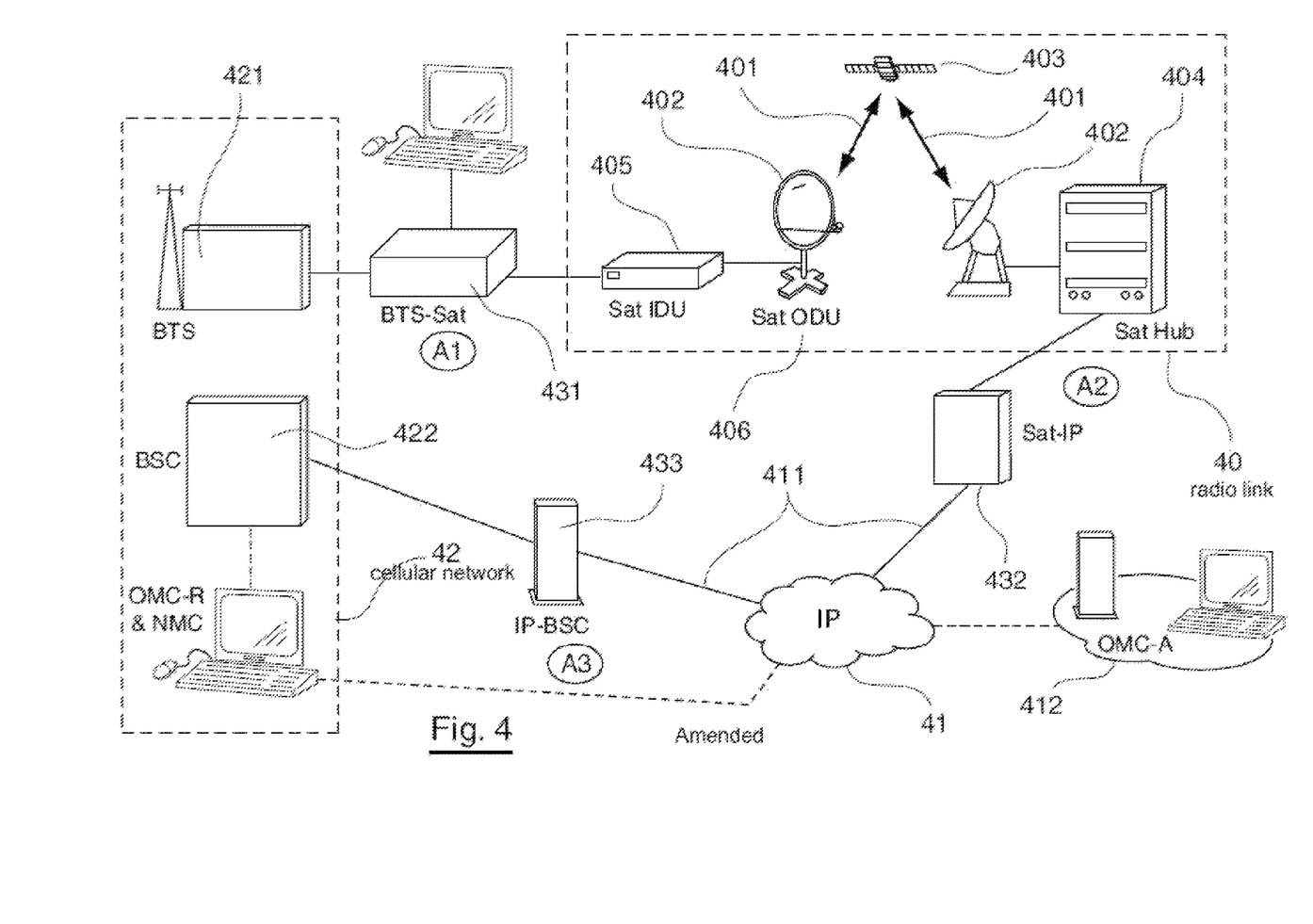
FIG. 4 shows the general configuration of an embodiment of the invention.

In relation with FIG. 4, the general configuration wherein the invention is implemented, in a preferred embodiment, comprises three main entities:
 a cellular network 42 of the GSM type;
 a radio link 40 with dynamic allocation of dynamic and shared resources of the DAMA type;
 an Internet network 41 operating according to the Internet IP protocol.

More precisely, the cellular network 42 comprises, conventionally, at least one base station 421 (BTS in the particular case of GSM) controlled by a base station controller 422 (BSC in the particular case of GSM). The BTS and the BSC communicate thus via a channel that is designated as BTS-BSC, or as the interface Abis (described in the preamble of this description).

In the configuration shown in FIG. 4, this channel is supported by two types of links: a first radio link via satellite 401, provided by two transmitting/receiving antennas 402 and a geostationary-earth-orbiting satellite 403, and a second link 411 according to the Internet IP protocol.

On the radio link, a device 404 called "Hub" is in charge of allocating the necessary radio resources, via the satellite 403, for the carriage of the traffic data to be transmitted between BSC 422 and BTS 421.

The Hub operates by communicating with a device 406 ODU (for "Outdoor Unit") and an equipment 405 IDU (for "Indoor Unit").

An embodiment of this invention thus makes it possible to carry out and maintain the aforementioned BTC-BSC channel.

For this, the invention is implemented, in a preferred embodiment, at three interface levels:
 a first BTS/Satellite interface;
 a second satellite/IP interface;
 a third IP/BSC interface.

Recall that, conventionally, the BSC communicates with the BTS(s) that depend on it be transmitting a portion of the signalling data, via signalling channels, and traffic data, containing the payload, via a traffic channel.

An embodiment of the invention thus consists in analysing the signalling data, while transmitting it, in order to deduce the radio resources to be allocated to the satellite link. In other terms, the messages and the control data are "spied upon", which are not at the source intended for the satellite system, but of which the content is analysed in such a way as to optimise the radio resources to be allocated.

More precisely, an embodiment of the invention can be implemented by three devices 431, 432, 433, named adapters, located on each of the aforementioned interfaces, and of which the main characteristic is to observe and analyse the content of the signalling initially intended for the entities included in the cellular network.

In a particular embodiment, the adapter 431 A1 can be an integral part of the BTS.

The exchange of data on interfaces linked to the cellular network, is generally of the circuit type, or "virtual circuit", due to the fact that the data to be transmitted correspond mainly to voice, requiring a short period of time and which does not vary greatly. However, this same data is transformed in order to be exchanged in the form of packets over the satellite 401 and IP 41 links. The adapters 431 and 433 therefore have for function to transform this data from the circuit mode to packet mode and vice versa.

Finally, the system exchanges in addition internal data packets between each of the adapters 431, 432, 433 and with the OMC-A 412. The OMC-A implements the functions of operation and maintenance linked with the configuration and the supervision (alarms, traffic) of the adapters.

An embodiment of the invention thus resides in the fact that the radio resources are allocated dynamically by the adapters 431 and/or 432, according to the results of their analysis of the content of the signalling channels initially intended solely for the BSC 422 or the BTS 421. The system, thanks to the processing of the adapters, thus detects the exact status of the communications and determines with this information an optimal allocation of the radio resources.

More precisely, in the particular case of a speech data flow, a bi-directional radio channel is then allocated by the system between the adapters 431 and 432, when the latter has detected that a communication has effectively become active between the BTS 421 and the BSC 422, and this thanks to the analysis of the signalling channel.

In a first embodiment, the invention thus predicts, according to what is detected and analysed in all of the signalling channels, a quantity of incremental resources to be assigned.

It can be seen here that the technique of an embodiment of the invention is differentiated from the conventional techniques of the state of the art in that the resources are allocated only if and when an actual need has been detected, i.e. only upon reception of data indicating that a communication is effectively active. This differs from techniques in the state of the art wherein the radio resources are generally allocated as soon as any data arrives on the interface with the radio terminal: as such, for example, with the techniques via satellite even when carried out in IP packet mode, conventionally a circuit (virtual) for voice communication is set up on the satellite during the entire phase of call signalling and releasing. This can be highly penalising for communications of short duration, and particularly if in the end the call does not complete after the signalling phase.

The transmission of data between the two interfaces A2 and A3 is accomplished according to the standard IP protocol. The two adapters 432 and 433 of an embodiment of the invention located on these two interfaces therefore have the characteristic of adding to the transmitted signals all of the protocol elements needed for optimal transport.

Indeed, in the current implementations wherein the interface Abis is supported with an IP transport and on a radio link, the BTS/Sat interface A1 conventionally uses a device that generates packets strictly in the IP format to the terminal IDU

405. The latter are then transported via satellite and then via Internet to the IP/BSC interface, with no intermediate processing by equipment of the adapter 432 type.

The inventors have however observed that this system is sub-optimal since it introduces substantial additional fields of information ("overhead") and which are penalising on the radio channel via satellite. This degradation can cause a cost overrun for radio resource usage (satellite) of up to 100%.

Thus the simple fact of introducing the adapter 432 on the Sat/IP interface is therefore of an inventive nature, since it makes it possible to optimise the radio link in "packet" mode as simply as possible, without the elements linked to the IP protocol, and this intermediate adapter is entirely non-existent in the current implementations.

In a particular embodiment, the functions of the adapter 432 can be an integral part of the device in charge of controlling satellite radio resources.

2. Loopback of the Single-Cell Speech

In one of its particular and advantageous implementations, the system detects that an exchange of speech is taking place between two mobiles present in a geographic zone covered by the same BTS. This embodiment of the invention is described in relation with FIG. 5.

Figure 5:
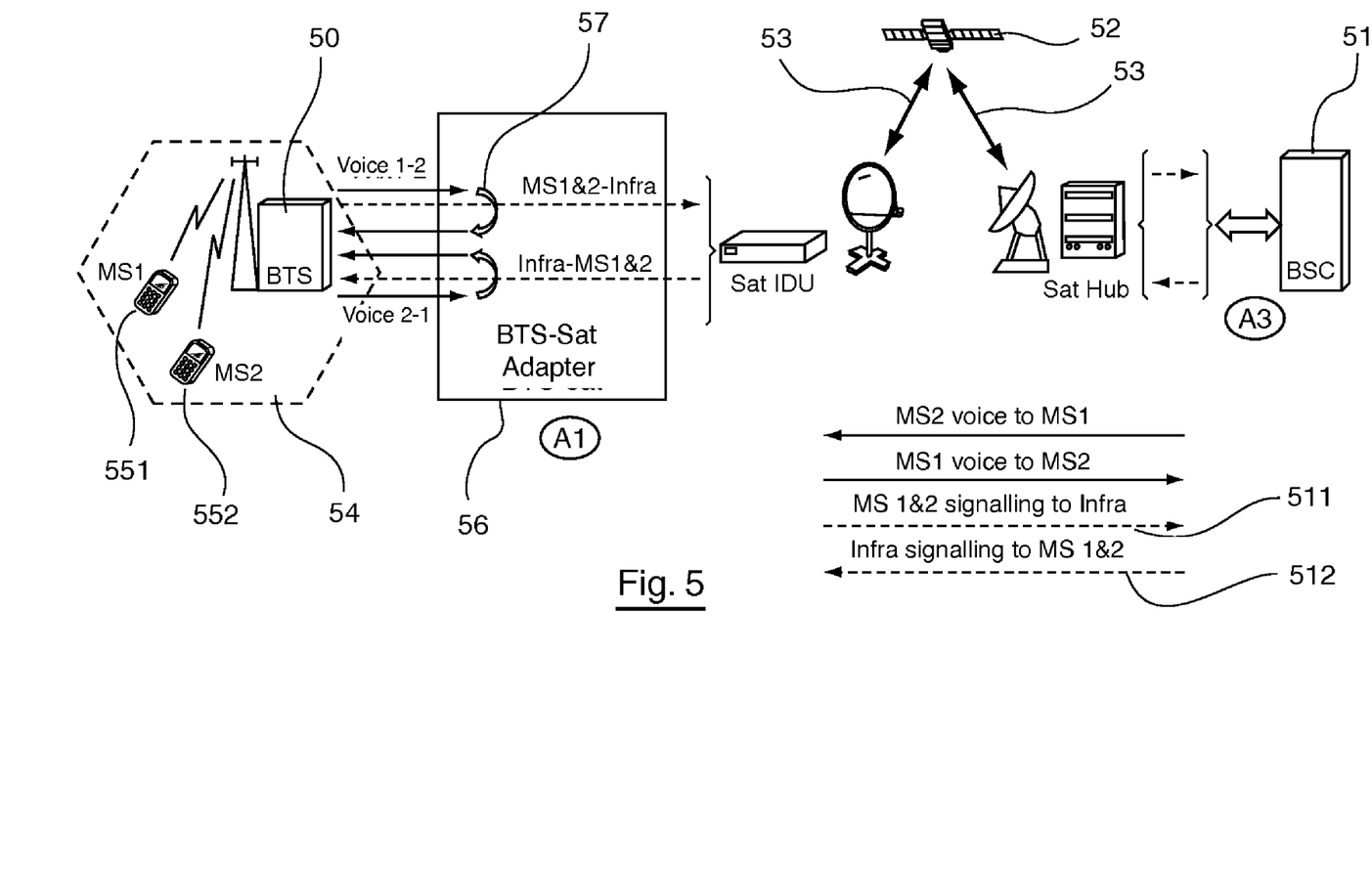
FIG. 5 shows a first embodiment of the invention, wherein a single-cell loopback of speech is implemented.

Two users located in the same cell 54 of the cellular network covered by the BTS 50 are in communication via their respective mobile station 551 and 552. The inventors have observed that in such a configuration, the usual realisation demands that the flow of speech passes through the BSC, and even reverts back up to the MSC of the GSM system, causing the corresponding transmission delay. A local communication then suffers twice from the satellite transmission delay.

An embodiment of the invention thus proposes to detect that an exchange of speech is taking place between two mobiles that depend on the same BTS, and, where applicable, does not allocate a bi-directional radio resource on the satellite link to transport traffic packets of the speech type. In this way radio resources are saved and the communication transfer time is greatly reduced.

The adapter 56 on the BTS/Satellite interface then carries out a local loopback 57 of the traffic packets.

In the particular embodiment shown in FIG. 5, the means implemented to perform the loopback are incorporated into the adapter 56. However, it is considered, in another embodiment, that the means for implementing the loopback are directly incorporated into the BTS.

The inventors have identified several means for detecting the local nature of a call: by analysing the contents of the speech signal itself, i.e. the traffic data, or by analysing the contents of the signalling messages.

3. Loopback of the Multi-Cell Speech

Figure 6:
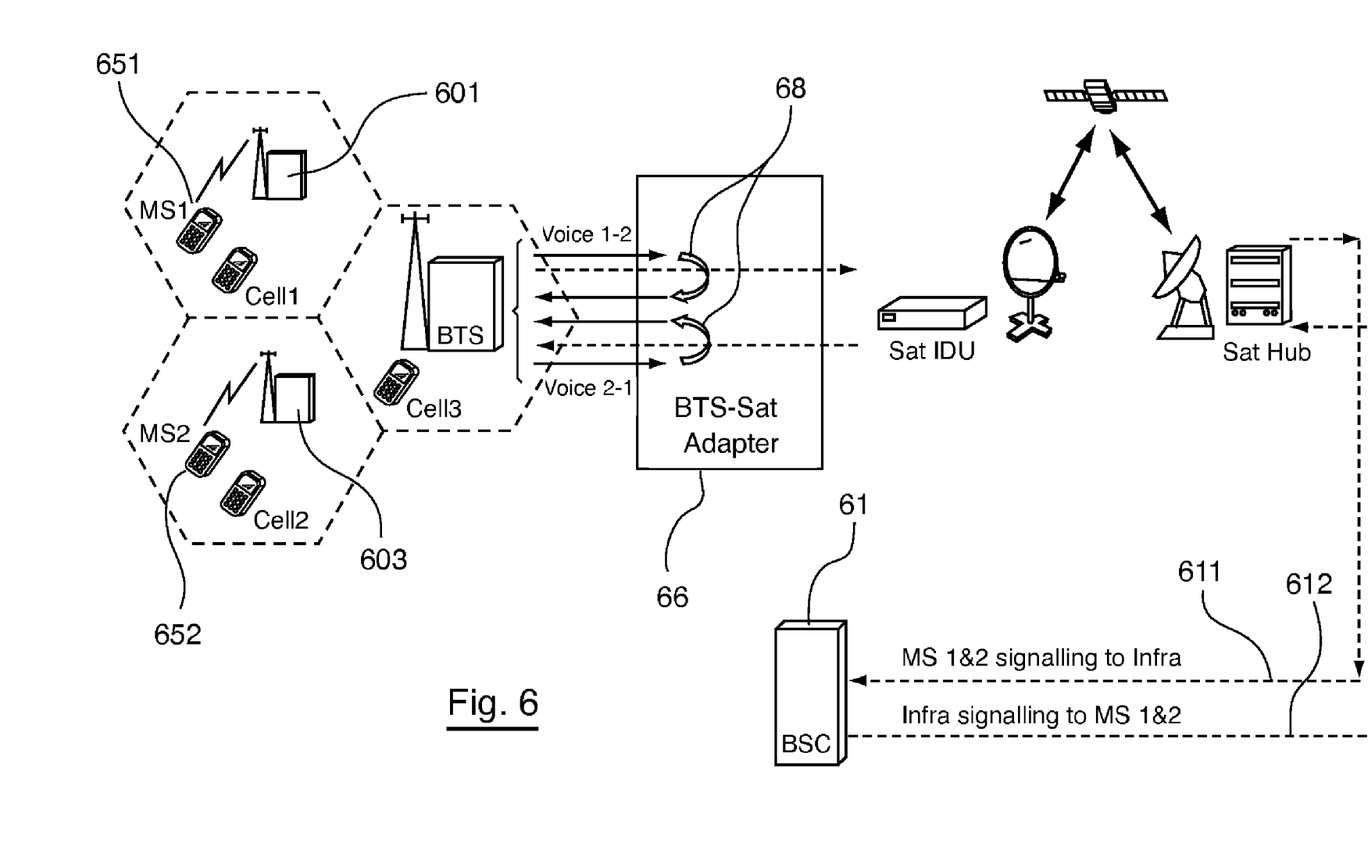
FIG. 6 shows a second embodiment of the invention wherein a multi-cell loopback of speech is implemented.

In relation with FIG. 6, an embodiment of the invention also implements a loopback 68 of the speech, on the BTS/Satellite interface, via the adapter 66, when the caller 652 and the correspondent 651 are each in different BTSs 601 and 602, but depend on the same termination radio and thus on the same BTS/Satellite adapter 66.

For more details concerning the implementation of the local loopback, those skilled in the art can refer to the patent application filed on the same date as this patent application, by the same applicant, having for title "Method for optimising transmission resources by local loopback in a mobile radio communication cellular network, network and local adapters thereof".

4. Handling Intercellular Transfers ("Handovers")

Due to its nature of dynamically allocating radio resources, the system according to an embodiment of the invention optimises the radio resources when the users are moving. Indeed, it is habitual that a user of the network moves during the communication, and thus passes into a geographic zone covered by a BTS that is different from the one managing the beginning of the communication for example.

The system of an embodiment of the invention thus verifies, permanently and continuously, the location of the users, by spying on the content of the signalling channels 511, 512 (in relation with FIG. 5), 611, 612 (in relation with FIG. 6) exchanged between BTS and BSC according to the GSM standard, and containing the data relative to the need for traffic data.

There are two cases:
- the two users in communication are initially located in such a way that a single-cell or multi-cell loopback is implemented, then one of the two users changes zone (outgoing handover);
- no loopback is initially implemented and one of the two users changes zone, in such a way that it is possible to activate a mono- or multi-cell loopback (incoming handover).

In the first case, recall that no bi-directional radio resource is allocated, since this is a case of loopback. The permanent verification of the system of the need "not to loopback" is carried out for example by the adapter 431 (in relation with FIG. 4), located on the BTS/Satellite interface, which informs the adapter 432 located on the Satellite/IP interface, via an internal message. The Satellite/IP interface then controls the hub device 404 by informing it of the radio resources that need to be assigned. This control is realised as soon as the adapter 431 located on the BTS/Satellite interface detects the presence of the ACTIVATE element.

5. Processing within BTS/Satellite and Satellite/IP

Conventionally, in the particular case of the DVB-RCS satellite transmission standard, it is a satellite terminal equipment called IDU (for "Indoor Unit") 405 in relation with FIG. 4, which is in charge of making an allocation request to Hub 404, covering the function of NCC (for "Network Control Centre") of the standard, the latter having in particular the role of controlling the radio resources.

In this case, as soon as the adapter 431 located on the BTS/Sat interface detects the presence of the ACTIVATE message in the signalling channel, it then orders the device IDU 405 to reserve radio resources. The latter will be of a nature to allow for the regular flow of speech, either at 16 kbits/s (Full Rate), or at 8 kbits/s (Half Rate).

Making use of the terminology of the DVB-RCS standard, the radio channel allocated will thus be either of the CRA nature (for "Continuous Rate Assignment"), or of the RBDC nature (for "Rate Based Dynamic Capacity").

In a third embodiment, the activation of a reservation of radio resources is done directly on device Hub 404. So it is the adapter 432 located on the Satellite/IP interface that detects the presence of the ACTIVATE element in the signalling channel, dedicated initially to the BSC and to the BTS, and which controls the adapter 432. The inventors have noted that, in this latter embodiment, the activation of radio resources is faster, since it avoids a transmission delay from the IDU 405 to the Hub 404.

The technique of an embodiment of the invention thus makes it possible to manage situation changes, during the communication, without any loss of data: the quality of service remains excellent.

In other terms, in the case of an intra-BTS, or intracellular, communication, if the local communication conditions change, for example when one of the two mobiles in communication changes cells, the system is able to re-establish a conventional bi-directional communication according to the path of the three BTS/Satellite-Satellite/IP-IP/BSC interfaces, without any loss of data, such as speech for example.

The technique of an embodiment of the invention thus permanently verifies the status of the traffic, by monitoring in the signalling channels the arrival of elements (such as the ACTIVATE or RU CHANNEL RELEASE messages in particular) that trigger an action of reserving or of releasing radio resources.

6. Optional Reversion of the Vocal Signal

Recall that, according to an embodiment of the invention, when a speech communication is detected as having a local nature, no radio resource is allocated on the satellite link, thus saving satellite resources.

In the normal embodiment, in such a way that the system is compliant with the GSM system, the adapter located on the IP/BSC interface, i.e. between the IP network and the BSC, generates a virtual flow of speech, for example a random flow, in order to supply the BSC that is not aware of the existence of a local loopback.

However, it may be necessary to have to satisfy the legal interception requirements, and thus to have to be able to revert the speech signal effectively back up to the BSC, in the case of local multi-cell loopback as well as in the case of local mono-cell loopback.

For this, the system establishes a unidirectional link, which carries the speech data from the BTS/Sat interface to the Sat/IP interface. This thus makes it possible for the IP/BSC interface to reconstitute coherent speech data at the BSC.

7. Generalisation

Of course, the invention is not limited to the examples of embodiments mentioned hereinabove.

In particular, those skilled in the art can make any alternative in the location and the operation of the three types of adapters of an embodiment of the invention according to the characteristics of the link between BTS and BSC. It may occur for example that there is no IP link implemented and that a BSC is directly in communication with its BTSs via a radio link. In this case, the BSC is located at the controller of the radio equipment and there is no need to transport the data over IP and the functions of the adapters located on the Satellite/IP and IP/BSC interfaces can be confounded in the same piece of equipment.

Finally, even if the embodiment described here implements a radio link via satellite, those skilled in the art will know how to transpose the principles and techniques of this invention to any system with radio resources used to connect BTSs, such as for example links by radio beams ("microwaves"), or systems of the LMDS ("Local Multipoint Distribution Systems") type, or other land transmission systems of the WiFi, WiMAX (for "Wireless Microwave Access") type, etc.

In conclusion, the mechanisms presented here make it possible to minimise the radio resource used, particularly costly in the case of the use of a satellite link, while maximising the quality of service rendered by minimising the transit time, which is highly perceptible in the case of the use of a geostationary-earth-orbiting satellite.

An embodiment of the invention provides a technique that allocates in the most optimal manner possible the radio resources needed to establish and maintain phonic communications in a network of the cellular type and that implements a radio transmission link, of the satellite type in particular.

An embodiment of the invention provides such a technique that is particularly adapted to the case where the radio transmission link is a link of the radio shared resources type between at least one base station and at least one base station controller.

An embodiment of the invention provides such a technique that provides a major gain in terms of communication set-up time and in the call success rate in relation to the conventional techniques of prior art.

An embodiment of the invention reduces the costs of a communications system, while still maintaining an equivalent quality of service, and even better than that obtained with the conventional techniques. As such, an embodiment of the invention allows rural regions in the emerging countries that have little means to access the GSM service, in good economic conditions, as in the rest of the world.

An embodiment of furthermore provides a technique that is adapted to the transfer of data for phonic communications, i.e. for the transfer of voice and, more generally, to the transfer of data in real time of the circuit type, while still being able to effectively transfer data of a more impulsive nature, in packet mode.

An embodiment of the invention is compatible with most of the existing methods of optimising radio resources, such as in particular switching to packet mode IP, or the introduction of compressors that eliminate the unnecessary frames of silence.

An embodiment of the invention additionally reduces to a minimum the cost of the transmission over radio channels, particularly in the case of transmission via satellite.

An embodiment of the invention improves the quality of service by minimising the end-to-end communication set-up time, and by eliminating as soon as possible the transfer time over the shared radio channel.

Although the present disclosure has been described with reference to one or more examples, workers skilled in the art will recognize that changes may be made in form and detail without departing from the scope of the disclosure and/or the appended claims.

The invention claimed is:

1. Method for optimising allocation of resources in a mobile radio communication cellular network, said cellular network comprising at least one base station, called BTS, controlled by a base station controller, called BSC, and a connecting network connecting said BTS(s) with said BSC,
   wherein setting up, maintaining and terminating communications with a mobile station of said cellular network are implemented by exchanges of signalling messages,
   wherein said connecting network includes at least one link of a radio type with shared resources between said base station(s) and said base station controller, and
   wherein the method comprises the following phases:
      a first analysing phase of a content of all or a portion of said signalling messages, said analysing phase including:
         a step of searching for and detecting in said content of said signalling messages data indicating a traffic activity;
         a step of analysing "in band" control data that transits in a traffic channel, said step of analysing "in band" control data allowing to take into account in the allocation of the resources of other data concerning at least one of a type of coding used or a speech activity rate;
      a second phase of allocating or not allocating of resources within said radio link with shared resources according to said data indicating a traffic activity.

2. Method for optimising as set forth in claim 1, wherein said analysing phase comprises an additional step of detecting if said mobile station of said communication are located downstream of a same termination of said radio link radio with shared resources, according to a detection strategy including a step of analysing all or a portion of said signalling messages, and wherein the method comprises a third phase of triggering a local loopback operation of all or a portion of data exchanged between said mobile stations, without reservation of a traffic channel within said radio resources, in a case where said detecting phase confirms that said mobile stations of said communication are located downstream of the same termination of said radio link with shared resources, said third phase having priority in relation to said second phase.

3. Method for optimising as set forth in claim 2, wherein at least some of the signalling messages continue to be carried even in the case of a local loopback.

4. Method for optimising as set forth in claim 1, wherein said information indicating a traffic activity is constituted by a signalling message indicating characteristics of needs to allocate resources in the link between said base station and a caller mobile station, or said base station and a called party mobile station.

5. Method for optimising as set forth claim 1, wherein said second phase comprises an additional step of searching for and detecting, in the signalling messages, data indicating a termination of a need of traffic, and wherein the method comprises a fourth phase of releasing resources that were previously allocated within the radio link with shared resources according to said data indicating a termination of a need of traffic.

6. Method for optimising as set forth in claim 1, wherein said allocation of resources within said radio link with shared resources comprises reserving an elementary communication resource at a predetermined rate within said shared radio resources, from among a plurality of elementary resources that can be reserved individually.

7. Method for optimising as set forth in claim 1, wherein said radio link with shared resources is constituted of a plurality of transmission channels that can be reserved incrementally, and a prediction of radio resource needs takes into account radio resources that have already been allocated in said radio link with shared resources, in order to optimise global usage of the radio resources.

8. Method for optimising as set forth in claim 1, wherein said signalling messages are compliant with the GSM standard, and said data indicating a need for traffic comprises reception of an "ACTIVATE" message.

9. Method for optimising as set forth in claim 1, wherein said signalling messages are compliant with the GSM standard, and said data indicating the end of a need of traffic comprises reception of an "RF CHANNEL RELEASE" message.

10. Method for optimising as set forth in claim 1, wherein said radio link with shared resources is of a satellite link type, with centralised management of the shared resources of a DAMA ("Demand Assigned Multiple Access") type.

11. Method for optimising as set forth in claim 1, wherein the method is implemented in order to optimise the allocation of the channels of a link with shared resources located this time between the BSC and a mobile service switch of a cellular network of a GSM or equivalent type.

12. Cellular network comprising:
at least one base station, called BTS, controlled by a base station controller, called BSC, and a connecting network connecting said BTS(s) with said BSC, wherein setting up, maintaining and terminating communications with a mobile station of said cellular network are implemented by exchanges of signalling messages, wherein said connecting network includes at least one link of a radio type with shared resources between said base station(s) and said base station controller, and wherein the cellular network comprises means for implementing the following phases:
a first analysing phase of a content of all or a portion of said signalling messages, said analysing phase including:
a step of searching for and detecting in said content of said signalling messages data indicating a traffic activity;
a step of analysing "in band" control data that transits in a traffic channel, said step of analysing "in band" control data allowing to take into account in the allocation of the resources of other data concerning at least one of a type of coding used or a speech activity rate;
a second phase of allocating or not allocating of resources within said radio link with shared resources according to said data indicating a traffic activity.

13. Cellular network as set forth in claim 12 wherein said means for implementing of said phases and of said steps are located in at most three adapter devices located in the network, and said adapters belong to the group comprising:
a first adapter located on the said base station(s);
a second adapter located on the central management equipment of shared radio resources;
a third adapter located on the controller of the said base station(s).

14. Network as set forth in claim 13, wherein the network comprises means of operation and maintenance of said adapters, said means communicate with each of said adapters in such a way as to configure, and/or supervise and/or observe said adapters.

15. Cellular network as set forth in claim 12, wherein the cellular network comprises first means of adaptation A1 connected on one side to said BTS(s) by an interface of an E1 type, and on the other side to a termination equipment of said radio link, said means of adaptation A1 fulfilling in particular at least one of the functions belonging to the following group of functions:
analyse signalling messages exchanged with said BTS(s) and/or in-band control data in traffic channels;
analyse a need for local loopback and/or triggering of a local loopback operation;
communication with a central equipment for maintenance operation.

16. Cellular network as set forth claim 12, wherein said connecting network includes at least one second link of the Internet Protocol (IP) type, and comprises:
a second means of adaptation A2 located between said link of the radio type and said link of the IP type;
a third means of adaptation A3 located between said second channel of the IP type and said base station controller;
and wherein traffic data and signalling data are transported by packets according to the standard IP protocol between said second and third means of adaptation.

17. Cellular network as set forth in claim 16, wherein data exchanged between said first and second means of adaptation A1 and A2, using the shared resource radio network, does not carry "overheads" needed for the IP protocol, which are introduced only between A2 and A3.

18. Cellular network as set forth in claim 16 wherein, said adapter A1 utilises "overheads" necessary for the IP protocol and consequently:
- A1 can communicate directly with A3 according to the IP protocol;
- A2 may not be introduced in the connecting network.

19. Cellular network as set forth in claim 12, wherein said radio link with shared resources implements a satellite.

20. Adapter that can be used in a cellular network according to claim 13, wherein the adapter constitutes an adapter A2 and fulfils in particular at least one of the functions belonging to the following group of functions:
- conversion of signals transiting through the radio/IP interface, in one direction or the other in particular:
  - adding/removing from the transmitted signals all of protocol elements needed for IP transport;
  - optimisation of the radio link in "packet" mode as simply as possible, without elements linked to the IP protocol;
- implementation of the phases of analysing signalling messages and/or allocating or not allocating resources within the radio link with shared resources, wherein said phase of analysing signalling messages comprises:
  - a step of searching for and detecting in said content of said signalling messages data indicating a traffic activity; and
  - a step of analysing "in band" control data that transits in a traffic channel, said step of analysing "in band" control data allowing to take into account in the allocation of the resources of other data concerning at least one of a type of coding used or a speech activity rate;
- analysing a need and/or triggering of a local loopback operation and/or permanent verification of a need for "non loopback" via a specific internal message;
- transfer of speech data received from the BTS/radio interface A1 to the radio/IP interface A2 in order to reconstitute coherent speech data at the BSC in order to satisfy legal interception requirements.

21. Adapter that can be used in a network according to claim 13, wherein the adapter constitutes an adapter A3, and fulfils in particular at least one of the functions belonging to the following group of functions:
- conversion of signals transiting through the IP/BSC interface A3, in one direction or the other in particular:
  - adding/removing from the transmitted signals all of protocol elements needed for IP transport;
  - reconstitution of a standard interface Abis with the BSC;
- generation of a virtual speech flow, for example a random flow, to supply the BSC in case of local loopback;
- reconstitution of coherent speech data at the BSC, based on speech data of the BTS/radio interface A1, in order to satisfy legal interception requirements;
- reconstitution, where applicable, of coherent speech data.

22. Adapter as set forth in claim 20, wherein the adapter is incorporated into a control device for said shared resource link.

23. Adapter as set forth in claim 16, wherein the functions of adapters A2 and A3 are confounded in the same piece of equipment.

24. Adapter as set forth in claim 15, wherein said first means of adaptation A1 are incorporated into said base station.

25. Adapter as set forth in claim 21, wherein said third means of adaptation A3 are incorporated into said base station controller.

* * * * *